US009607057B2

(12) United States Patent
Mason et al.

(10) Patent No.: US 9,607,057 B2
(45) Date of Patent: Mar. 28, 2017

(54) SYSTEM AND METHOD FOR BUILDING MULTIPLE ONLINE LEGAL RESEARCH APPLICATIONS

(75) Inventors: Eamon Mason, New Malden (GB); Andre Lambrechts, Baar (CH)

(73) Assignee: Thomson Reuters Global Resources, Baar (CH)

( * ) Notice: Subject to any disclaimer, the term of this patent is extended or adjusted under 35 U.S.C. 154(b) by 691 days.

(21) Appl. No.: 12/534,692

(22) Filed: Aug. 3, 2009

(65) Prior Publication Data

US 2010/0131531 A1     May 27, 2010

Related U.S. Application Data

(60) Provisional application No. 61/137,712, filed on Aug. 1, 2008.

(51) Int. Cl.
| | | |
|---|---|---|
| G06F 17/30 | (2006.01) | |
| G06F 7/00 | (2006.01) | |
| G06Q 10/10 | (2012.01) | |
| G06Q 50/18 | (2012.01) | |

(52) U.S. Cl.
CPC ......... *G06F 17/3056* (2013.01); *G06Q 10/10* (2013.01); *G06Q 50/18* (2013.01)

(58) Field of Classification Search
CPC ..................... G06F 17/30011; G06F 17/30867
USPC .......................... 707/999.003, 706, 779, 758
See application file for complete search history.

(56) References Cited

U.S. PATENT DOCUMENTS

| | | | | |
|---|---|---|---|---|
| 5,870,550 | A * | 2/1999 | Wesinger, Jr. ...... | G06F 17/3089 707/999.01 |
| 6,141,659 | A * | 10/2000 | Barker .............. | G06F 17/30634 |
| 6,167,369 | A * | 12/2000 | Schulze .......................... | 704/9 |
| 7,036,121 | B1 * | 4/2006 | Casabona ................ | G06F 8/61 717/173 |
| 7,085,755 | B2 * | 8/2006 | Bluhm .............. | G06F 17/30011 |
| 7,207,005 | B2 * | 4/2007 | Lakritz ........................ | 715/201 |
| 2004/0003388 | A1 * | 1/2004 | Jacquemot ............... | G06F 8/71 717/174 |
| 2004/0138979 | A1 * | 7/2004 | Juhre ..................... | G06Q 10/10 705/36 R |
| 2005/0149343 | A1 * | 7/2005 | Rhoads et al. .................... | 705/1 |
| 2005/0177358 | A1 * | 8/2005 | Melomed et al. ................ | 704/2 |
| 2005/0251488 | A1 * | 11/2005 | Saunders .............. | G06F 21/121 705/59 |
| 2006/0010434 | A1 * | 1/2006 | Herzog ............... | G06F 9/44505 717/168 |
| 2006/0156278 | A1 * | 7/2006 | Reager ..................... | G06F 8/70 717/104 |
| 2006/0277187 | A1 * | 12/2006 | Roese ....................... | G01S 5/02 |

(Continued)

*Primary Examiner* — Kuen Lu

(57) ABSTRACT

The present inventors devised, among other things, an application development system and method. One exemplary method entails providing a set of legal research application feature or functions and receiving a first configuration file from a user, selectively enabling or disabling one or more of the features to define a first legal research application on a first server for a first country. The method further entails receiving a second configuration file from a user, which similarly selectively enables or disables one or more of the features to define a second legal research application on a second server for a second country. The configuration files also customize the user interfaces accord to brand specific criteria for each of the countries.

10 Claims, 2 Drawing Sheets

(56) References Cited

U.S. PATENT DOCUMENTS

| | | | |
|---|---|---|---|
| 2007/0268523 A1* | 11/2007 | Ferrara | G06Q 30/02 358/1.18 |
| 2007/0276854 A1* | 11/2007 | Gold | G06F 17/30696 |
| 2008/0071772 A1 | 3/2008 | Rosenoff et al. | |
| 2009/0217196 A1* | 8/2009 | Neff et al. | 715/799 |
| 2009/0240689 A1* | 9/2009 | Fenne et al. | 707/5 |
| 2010/0030749 A1* | 2/2010 | Dahn | G06F 17/30637 707/706 |
| 2011/0156880 A1* | 6/2011 | Rygaard | G06F 8/61 340/10.1 |
| 2014/0056181 A1* | 2/2014 | Croak | H04M 3/42263 370/259 |

* cited by examiner

SYSTEM AND METHOD FOR BUILDING MULTIPLE ONLINE LEGAL RESEARCH APPLICATIONS

RELATED APPLICATION

The present application claims to priority to U.S. Provisional Patent Application 61/137,712, which was filed Aug. 1, 2009 and which is incorporated herein by reference.

U.S. Pat. No. 7,085,755, entitled "Electronic Document Repository Management and Access System" which was filed on Nov. 7, 2002 and issued on Aug. 1, 2006, is also incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2008, Thomson Global Resources.

TECHNICAL FIELD

Various embodiments of the present invention concern online legal research applications, particularly systems and method of efficiently providing these applications across multiple countries.

BACKGROUND

In many legal systems across the world, lawyers and other legal professionals research laws and past court decisions to help them serve the legal needs of their clients. To assist these legal professionals, businesses, such as Thomson Reuters, provide online legal research services, such as the popular Westlaw service, that provides not only rich databases and technically advanced search tools, but also sophisticated case analysis and alert functions. Thomson Reuters provides similar online legal research services in the Argentina, Australia, Canada, Chile, Denmark, Hong Kong, Japan, New Zealand, South Africa, Spain, Sweden, Switzerland, and the United Kingdom.

One problem that the present inventors recognized is that developing and providing online legal research services, particularly the software applications that actually make it possible to deliver the services, is time consuming and expensive. Moreover, when providing these applications in multiple countries, which have different languages, laws and ways of organizing and researching laws and past legal decisions, the time and expense multiplies. The magnitude of these costs raises the question of whether the cost for developing or even updating a research application for a smaller country, such as Argentina, Denmark, or Spain is justified given the size of the legal market and the desire to achieve a reasonable return on investment.

Accordingly, the present inventors recognized a need for better ways of building online legal research applications.

SUMMARY

To address this and/or other needs, the present inventors devises, among other things, an application development system and method. One exemplary method entails providing a set of legal research application feature or functions and receiving a first configuration file from a user, selectively enabling or disabling one or more of the features to define a first legal research application on a first server for a first country. The method further entails receiving a second configuration file from a user, which similarly selectively enables or disables one or more of the features to define a second legal research application on a second server for a second country. The configuration files also customize the user interfaces accord to brand specific criteria for each of the countries. Some system embodiments employing the methodology outlined here support approximately 20 online products in 12 countries using 7 different languages.

Moreover, the exemplary embodiment provides search templates that translate user input into a user interface into appropriate queries for the jurisdictional specific databases. The search templates can be shared across legal research applications, enabling, for example, users of an application for UK legal research to potentially research caselaw in Denmark.

Some embodiments also provide a configuration-selectable tocectory feature. This feature provides a hierarchical table-of-contents type method of navigating and searching legal content, with the content associated with metadata that directs how it is to be displayed and what functionality a research application provides to interact with it.

Some embodiments operate beyond the legal domain. For examples, one or more embodiments operate in the financial, scientific, healthcare and media domains. So the present invention is not limited to legal research applications.

DETAILED DESCRIPTION

This description, which incorporates the figures and the appended claims, describes one or more specific embodiments of an invention. These embodiments, offered not to limit but only to exemplify and teach the inventive subject matter, are shown and described in sufficient detail to enable those skilled in the art to implement or practice the invention. Thus, where appropriate to avoid obscuring the invention, the description may omit certain information known to those of skill in the art.

Exemplary International Information-Retrieval System

Figure 1:
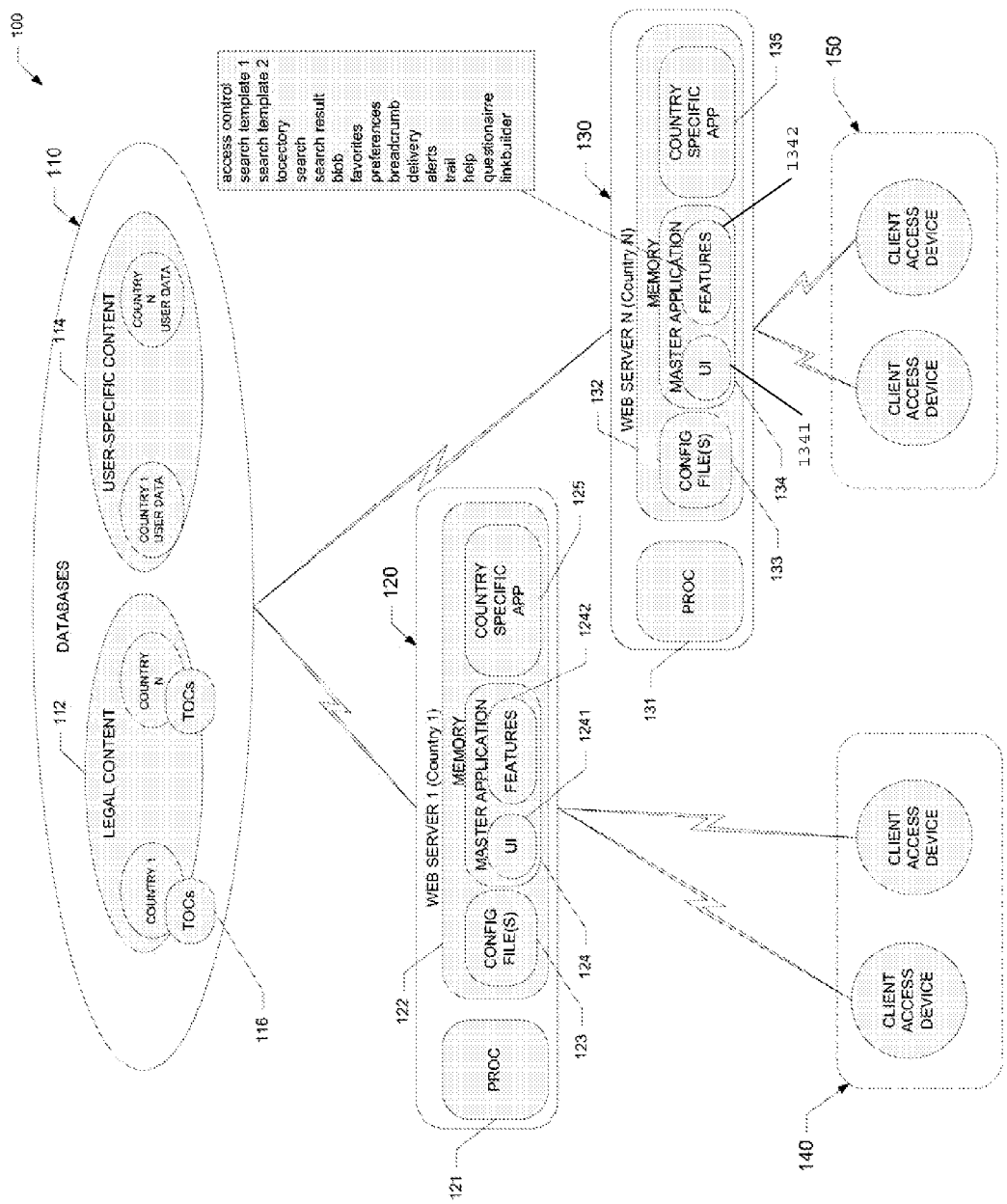
FIG. 1 is a block diagram of an exemplary multi-country legal research system which corresponds to one or more embodiments of the present invention.

FIG. 1 shows an exemplary international online information-retrieval (or legal research) system 100. System 100 includes one or more databases 110, server 120 and 130, and access devices 140 and 150.

Databases 110 include a set of legal research databases 112, and a set of user-specific content databases 114. Legal research databases 112, in the exemplary embodiment, include a caselaw, statutes, secondary legal research materials, and associated metadata for a variety of countries, delineated country . . . country 2 in the figure. Secondary legal research materials include legal documents of secondary legal authority or more generally authorities subordinate to caselaw and statutes. Metadata includes case law and statutory citation relationships, KeyCite data (depth of treatment data, quotation data, headnote assignment data, and so forth. User-specific content database include user-preference data, user usage history, such as research trails, breadcrumb data (information regarding documents accessed by a user), accounting data, subscription data, and authentication data.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to servers 120 and 130.

Servers 120 and 130, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a configuration module 123, a master application module 124, and a country specific application module 125. Similarly, server 130 includes a processor module 131, a memory module 132, a configuration module 133, a master application module 134, and a country specific application module 135. (For clarity of illustration only two servers are shown in the figure; however, the exemplary embodiment encompasses any number of country specific web servers, indeed more than one server may be ganged for a particular company. In general, the functional capabilities of these servers are identical or similar.)

More specifically, processor modules 121 and 131 each include one or more local or distributed processors, controllers, or virtual machines. In the exemplary embodiment, the processor modules assume any convenient or desirable form.

Memory modules 122 and 132, which take the exemplary form of one or more electronic, magnetic, or optical data-storage devices, store respective master application modules 124 and 134 and country-specific research applications 125 and 135.

Configuration modules 123 and 133 include sets of one of one or more configuration files to enable or disable one or more respective legal research application features associated with master legal research applications 124 and 134. In the exemplary embodiment, the configuration module includes XML configuration files, style sheets, java scripts, and cascading stylesheets, which enable or disable particular features of the master legal research application. The style sheets related primarily to customization of master user interfaces 1241 and 1341 to conform to country-specific branding. In this sense, these custom configured style sheets may be regarded as application "skins." Features 1242 and 1342 include the modular functional features of the master application which are selectably enabled or disabled via the configuration files. Some embodiments allow for enabling or disabling or otherwise controlling operation one or more deeper aspects of the functional features, rather than just turning the feature completely on or off.

A description of an exemplary set of features follows. However, in various embodiments, the set of features is expandable to include new features that are designed to be configured by configuration files.

Searching Feature: The searching feature allows the user to search the whole application or within specific content sets for documents that suit their requirements. This can either be via a basic search that allows the user to input some basic words or via an advanced search where the user can input single or multiple pieces specific known information. The feature also allows the user to narrow search results by conducting further searches within results returned. The exemplary search feature can search multiple databases and integrate results into a single search result list and can search any field of any document (although limited by the content).

Browsing Feature: The first page the user arrives at after logging into the application allows the user to start research straight away. At the very top of the page is a toolbar with links to the most useful tools and features available on the application and this would be available on every page of the site. Users can choose to look at particular content types in more detail by using the navigation bar near the top of the page, which lists the content types available to them. Once a content type has been selected the user can browse for documents by selecting links to lists of documents that suit their requirements. Users can browse through the lists right down to document level or utilize the search templates available to narrow their search.

Results Display Feature: The results display feature of MAF finds documents that match the search criteria, sorts and de-duplicates them and then displays them to the user in the form of a list. As well as just displaying the list of search results, there are a number of features that are also available to the user via the search results list screens. Examples of these are:

Editing their search
Conducting a new search
Re-sorting the search results list
Searching within the results returned
Delivering the results list
Saving the search to be used at a later date
Adding the search to their alerts, RSS Feeds list and be alerted when new documents are added.

Document display feature: Document display UI design patterns within the application are the result of a combination detailed analysis, best practice and standards. As well as just displaying the document of choice, there are a number of additional features that are also available to the user via the document display feature. Some examples of these are:

Viewing related documents
Term scrolling
Results scrolling
Viewing recently viewed documents
Delivering documents
Delivery: Delivery options within WLUK allow the user to print, save or e-mail search results or full text documents. As well as simply delivering the documents the user has a number of other options that can be available to them. Some examples of these are:

Document format
Displaying highlighted search terms
Including summary pages
Underlining of links within the documents
Highlighting search terms Alerts Feature: An alert allows users to stay up-to-date on new documents added and notify the users when new information is added to the system. Alerts are requests that run automatically at pre-set time intervals and the results are delivered automatically to users via email. Results include only documents added since the last time the Alert request was run. Subscribers are able to view and manage a list of their own Alerts.

RSS Feeds Feature: RSS feeds comprise XML feeds of new material added to the site that are viewable by subscribers through the subscriber's web browser. Each time a specific RSS feed is built, the previous content of the RSS feed is overwritten, meaning that material contained in an earlier RSS field can only be retained if the subscriber opts to cache the previous feed. The overall functionality is similar to Alerts and like alerts, subscribers are able to view and manage a list of their own RSS feeds.

PDF circulation List: PDF circulation lists works as Alerts and allows a user to stay up-to-date on new documents added, and notifies the user when new PDF documents are added to the system. Circulation lists are requests that run automatically at pre-set time intervals and the results are delivered automatically to users via email. Results include only documents added since the last time the request was run and subscribers are able to view and manage a list of their own Circulation lists.

Breadcrumb: The Breadcrumb feature enables users to revisit pages of an application that they have previously accessed. When the user navigates to a new page, the path of navigation taken by the user will be listed in the breadcrumb and this allows the user to see where they have been within the application and to return to pages previously viewed if required.

Trail: Trail is a feature that records the sequence of events that have been executed by the user, to enable them to view and access research carried out during that session. Users are also able access Previous Trails to view previous research conducted in earlier sessions. This feature is access controlled and can be turned on and off as required.

Saved Search: This feature allows the user to save commonly used searches for re-use at a later date. Saved searches can be created from any search results list whether the search has been conducted from the homepage, content landing pages or at any level of the tocectory and users are able to view and manage a list of their own Saved Searches. This feature is access controlled and can be turned on and off as required.

Preferences feature: Preferences is a feature that allows the user to alter settings according to their requirements, such as the users time zones, the number search results returned per page, the number of terms in context extracts displayed, the users E-mail address and the users Delivery Output options and format. Once the user has amended their settings they remain as the default settings until they are further amended. In the exemplary embodiment, the following items within this feature can be also customized according to requirements for individual applications:
  Format of date and time
  Text
  Language
  Delivery option defaults
  Available delivery formats.
  Available options for number of Terms in content extracts displayed.
  Available options for number of Search results displayed per page.

Access Control feature: Access Control feature is used to set the users access to different features within the application depending on their subscription. Most features within MAF can be switched on and off via Access Control. Examples include:
  Content sets
  Alerts/RSS Feeds/PDFs
  Delivery options
  Preferences
  Trail
  Saved Search Authentication Feature: Authentication Feature includes features such as logging in, new user login, changing passwords, forgotten password and timeout. Before a user can use any of the features within the application, they must first login. There are different ways a user can log in depending on the kinds of users they are. Typical types of user are:
  Users who access via a username and password
  Users who use the IP authentication feature preventing from having to log in when they view a doc from alerts results, a federated search tool or via other external links.
  Academic users who log in via a different login screen.

Billing feature: Billing is closely linked to Access Control. There are different levels of subscription and naturally different billing methods depending on the subscription type. The typical levels of subscription are:
  Users with subscription to every feature of the application
  Users with subscription to parts of the application where other content outside their subscription is completely blocked.
  Users with subscription to parts of the application where other content outside their subscription is on a Pay per View (PPV) basis.

Billing events are generated for the activities such as searching, Viewing documents including PDFs, document delivery and acceptance of PPV items.

Another feature within billing is the ability to use Client ID against billable activity to distinguish between research carried out for one client and another.

Web API feature: There are specific software providers who offer a range of federated searching tools for academic and commercial sectors. Web API Feature is an interface between the application and third party software providers in order to support federated searching. The Web API currently offers a search service and using third party software, a search request is sent to the application, and search results are returned to the end user. It is capable of searching all of the content collections configured for the application and searching on any of the configured fields appropriate to each collection. All the applications' collection sets and content sources would be available to the Federated searching tools. This is configurable to suit the end users needs, therefore bespoke collections sets that allow the users to search 2 specific content types at the same time could be created. There is also flexibility in the feature to search across all or specific fields available on basic and advanced templates for each collection as each customer will have different requirements for a federated search.

The search results displayed to the user are the same as if the search had been conducted within the application and contains all relevant links. By clicking links users can access the Document Display feature within the application, and view their selected document. Users also have the ability to be able to edit their search and conduct searches outside the Federated Search tool.

Linkbuilder: The Linkbuilder feature is a user interface to build deep links and allow users to create direct links to content on the application. A link can be created to a search template, a search result or to a specific document on the application. Links created can incorporate IP and Athens authentication if required and the links be used for purposes such as bulletins, reading lists or for publishing on intranets. This feature is access controlled, can be switched on and off as required.

Help Page Feature: Help pages within the application provided the user with everything they need to use the application, from the basics to more advanced techniques to get the most from the service. Help pages detail the features available within the application and how to use them, information about the source of the content, and also provides contact information on how to contact Customer Support teams. In some embodiments, help pages are accessed via links from any screen but would typically be available from on search templates for all content types and at all levels of the tocectory, and for features such as Alerts and RSS feeds.

Questionnaire Feature: The training tutorial is an interactive tool designed to guide users through every aspect of the application. At the end of the Tutorial the user is able to test their knowledge of the application with an interactive test consisting of multiple choice questions. Once the user has completed the test successfully they are able to download a Training Certificate.

In addition to the master user interface 1241 and master feature set 1242, master application modules include integration capability responsive to configuration files 123 to create a country-specific application instance 125. Generally, these instances are created at startup of the server; however, in some embodiments they are persisted in memory between startups.

Coupled via wireless or wired network connection to servers 120 and 130 are respective sets of access devices 140 and 150. In the exemplary embodiment, each access device takes the form of a personal computer, workstation, personal digital assistant, mobile telephone, or any other device capable of providing an effective user interface with a server or database. /Though not shown in FIG. 1, each access device includes a processor module, one or more processors (or processing circuits), a memory, a display, a keyboard, and a graphical pointer or selector. In operation, each of the access devices enables access to databases 110 through interaction with one of serves 120 or 130. The access devices may operate as thin clients or thick clients depending on their specific hardware configurations and how much of the country specific application software the devices host.

Exemplary Operation

Figure 2:
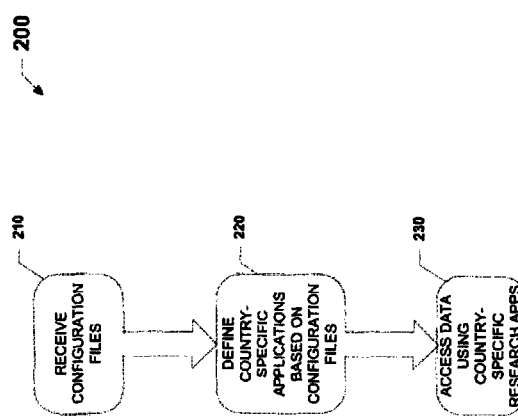
FIG. 2 is a flow chart of an exemplary method of operating the system of FIG. 1 and of providing legal research applications, which correspond to one or more embodiments of the present invention.

FIG. 2 shows a flow chart 200 of one or more exemplary methods of operating a system, such as system 100. Flow chart 200 includes blocks 210-230, which, like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

Block 210 entails receiving first and second sets of one or more configuration files. In the exemplary embodiment, the configuration files are XML files, and they include parameters for enabling or disabling one or more legal research application features of respective first and second master legal research application feature sets. These legal research sets are identical and are stored in different servers in the exemplary embodiment. However, in some embodiments, one of the legal research feature sets may include features not contained in the other.

Block 220 entails defining first and second country specific legal search applications based on the first and second configuration files and the master legal research application feature sets. In the exemplary embodiment, the resulting country specific legal research applications are stored in respective first and second web servers.

Block 230 entails first and second users in different countries accessing data using the first and second country specific legal research applications. In the exemplary embodiment, this access may entail use of one or more of the features selectively enabled by the corresponding configuration file. One such feature is the "TOCetory," a portmanteau term formed from table of contents (TOC) and directory. A tocectory allows a user to navigate from the highest level in the site design down to an individual document by clicking through the hierarchical structure (TOCs 116, FIG. 1). A search template can exist at each level in the hierarchy. The scope of the search corresponds to the user's location within the hierarchy.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. An international online legal research system comprising:
    a set of one or more databases including first and second country-specific legal research databases, the databases associated with legal research delineated by country and secondary legal research information;
    a first country-specific memory for storing first country-specific research applications associated with a first country;
    a second country-specific memory for storing second country-specific research applications associated with a second country;
    a first country-specific server for providing online access to the databases, the first server including one or more first country-specific configuration files which indicated selective enablement or disablement of one or more legal research application features of a first set of legal research application features, and an instance of a first legal research application based on the one or more first country-specific configuration files and the first set of legal research application features, the first server executing a first country-specific research application accessed from the first country-specific memory;
    a first master application module that integrates the first country-specific configuration files thereby creating at least one instance of the first country-specific application and storing in the first country-specific memory for subsequent access by the first country-specific server, wherein a breadcrumb feature is enabled for navigation to specific stored pages of the first country-specific application previously accessed;

a second country-specific server for providing online access to the databases, the second server including one or more second country-specific configuration files which indicate selective enablement or disablement of one or more legal research application features of a second set of legal research application features, and an instance of a second legal research application based on the one or more second country-specific configuration files and the second set of legal research application features, the second country-specific server executing a second country-specific research application accessed from the second country-specific memory;

second master application module that integrates the second country-specific configuration files thereby creating at least one instance of the second country-specific application and storing in the second country-specific memory for subsequent access by the second country-specific server, wherein a breadcrumb feature is enabled for navigation to stored pages of the second country-specific application previously accessed;

wherein each of the first and second sets of legal research application features includes a trail feature that stores a sequence of events executed by a user for facilitating access to prior research;

wherein the first and second sets of legal research application features are identical, wherein the legal research application features selectively enabled by the first country-specific configuration file, differs from the legal research application features selectively enabled by the second country-specific configuration file, and wherein the system further comprising at least one search template that translates user input into a user interface into appropriate queries for the first and second country-specific legal research databases, the search template being operative to be shared among the first and second legal research applications; and a client access device for receiving the user interface, the user interface being customizable based on specific criteria associated with at least a first country as stored in the first master application module, the use interface thereby conforming to a first country-specific branding.

2. The system of claim 1, wherein the first and second legal research applications are tailored for respective first and second languages.

3. The system of claim 1, wherein each of the first and second master sets of legal research application features includes a TOCectory feature.

4. The system of claim 1, wherein each of the first and second master sets of legal research application features include first and second search template for converting user input into respective first and second query languages.

5. The system of claim 1, further including first and second sets of one or more client access devices, wherein the first set of client access devices are located in a first country which has a first official language and the second set of client access devices are located in a second country which has a second official language, which is different from the first.

6. The system of claim 5, wherein the first country-specific configuration files include information for defining portions of a first user interface portion of the first legal research application, and the second country-specific configuration fifes include information for defining portions of a second user interface portion of the second legal research application.

7. A method of conducting country-specific online legal researches comprising:

receiving first and second country-specific sets of country-specific configuration files;

defining respective first and second country-specific online legal research applications in respective first and second country-specific web servers based on first and second sets of country-specific configuration files, the first and second country-specific web servers including respective identical first and second country-specific sets of legal research application features, the first legal research application is based on applying the first set of country-specific configuration files against the first set of legal research application features and the second legal research application is based on applying the second set of country-specific configuration files against the second set of legal research application features;

integrating the first set of country-specific configuration files using a first master application module thereby creating at least one instance of a first country-specific application and storing in the first country-specific memory for subsequent access by the first country-specific web server, wherein a breadcrumb feature is enabled for navigation to stored pages of the first country-specific application previously accessed;

integrating the second set of country-specific configuration files using a second master application module thereby creating at least one instance of a second-country specific application and storing in the second country-specific memory for subsequent access by the second country-specific web server, wherein a breadcrumb feature is enabled for navigation to stored pages of the second country-specific application previously accessed;

wherein at least one of the first and second sets of country-specific configuration files indicates enablement or disablement of a trail feature that stores a sequence of executed events;

wherein each of the first and second sets of country-specific configuration files indicate selective enablement or disablement of one or more legal research application features, wherein the legal research application features enabled by the first country-specific configuration file differs from the legal research application features enabled by the second country-specific configuration file, and wherein at least one search template translates users input into a user interface into appropriate queries for first and second country-specific legal research applications, the search template being operative to be shared among the first and second legal research applications; and receiving the user interface in a client access device, the use interface being customizable based on criteria associated with at least a first country as stored in the first master application module, the user interface thereby conforming to a first country-specific branding.

8. The method of claim 7, wherein at least one of the first and second sets of country-specific configuration files indicates enablement of an access control feature.

9. An international online research system comprising:

a first set of one or more databases including country-specific research databases, the databases associated with legal research delineated by country and secondary legal research information;

a first country-specific server having a first processor and a first memory, the first memory storing a first application having a first set of research application features, and a first country-specific configuration, the first country-specific configuration operative to indicate the control, enablement or disablement of one or more research application features of the first application;

a second country-specific server having a second processor and a second memory, the second memory storing a second application having a second set of research application features, and a second country-specific configuration, the second country-specific configuration operative to indicate the control, enablement or disablement of one or more research application features of the second application;

a first integration application module that integrates the first country-specific configuration thereby creating at least one instance of the first country-specific application and storing in the first memory for subsequent access by the first country-specific server, wherein a breadcrumb feature is enabled for navigation to stored pages of the first country-specific application previously accessed;

a second integration application module that integrates the second country-specific configuration thereby creating at least one instance of the second country-specific application and storing in the second memory for subsequent access by the second country-specific server, wherein a breadcrumb feature is enabled for navigation to stored pages of the first country-specific application previously accessed;

wherein each of the firm and second sets of research application features includes a trail feature that stores a sequence of events executed by a user for facilitating access to prior research;

wherein the first and second master sets of research application features are identical, wherein the research application features selectively enabled by the first country-specific configuration file differs from the research application features selectively enabled by the second country-specific configuration file, and wherein the system further comprises at least one search template that translates user input into a user interface into appropriate queries for the first and second country-specific research databases, the search template being operative to be shared among the first and second applications; and a client access device for receiving the user interface, the user interface being customizable based on specific criteria associated with at least a first country as stored in the first master application module, the user interface thereby conforming to a first country-specific branding.

10. A method of conducting country-specific online research comprising:

implementing a first instance of a research application having a first set of research application features with a first country-specific server according to a first country-specific configuration file, the first country-specific configuration file indicating the control, enablement or disablement of one or more research application features of the first research application;

implementing a second instance of a research application having a second set of research application features with a second country-specific server according to a second country-specific configuration file, the second country-specific configuration file indicating the control, enablement or disablement of one or more research application features of the second research application;

integrating the first country-specific configuration file using a first master application module thereby creating at least one instance of a first country-specific application and storing in the first country-specific memory for subsequent access by the first country-specific web server, wherein a breadcrumb feature is enabled for navigation to stored pages of the first country-specific application previously accessed;

integrating the second country-specific configuration file using a second master application module thereby creating at least one instance of a second country-specific application and storing in the second country-specific memory for subsequent access by the second country-specific web server, wherein a breadcrumb feature is enabled for navigation to stored pages of the second country-specific application previously accessed;

wherein each of the first and second sets of research application features includes a trail feature that stores a sequence of events executed by a user for facilitating access to prior research;

wherein the first and second sets of research applications features are identical, wherein the research application features affected by the first country-specific configuration file differs from the research application features affected by the second country-specific configuration file, and wherein at least one search template translates user input into a use interface into appropriate queries for first and second instances of the research applications, the search template being operative to be shared among the first and second instances of the research applications; and receiving the user interface in a client access device, the user interface being customizable based on specific criteria associated with at least a first country as stored in the first master application module, the user interface thereby conforming to a first country-specific branding.

* * * * *